United States Patent
Krause (12)

(10) Patent No.: US 9,296,304 B2
(45) Date of Patent: Mar. 29, 2016

(54) DEVICE FOR INDUCTIVELY CHARGING AT LEAST ONE ELECTRIC ENERGY STORE OF AN ELECTRIC VEHICLE

(75) Inventor: Axel Krause, Nesslau (CH)

(73) Assignee: BRUSA Elektronik AG, Sennwald (CH)

( * ) Notice: Subject to any disclaimer, the term of this patent is extended or adjusted under 35 U.S.C. 154(b) by 268 days.

(21) Appl. No.: 14/113,579

(22) PCT Filed: Apr. 27, 2012

(86) PCT No.: PCT/IB2012/052105
§ 371 (c)(1),
(2), (4) Date: Nov. 14, 2013

(87) PCT Pub. No.: WO2012/156846
PCT Pub. Date: Nov. 22, 2012

(65) Prior Publication Data
US 2014/0055090 A1 Feb. 27, 2014

Related U.S. Application Data

(60) Provisional application No. 61/487,567, filed on May 18, 2011.

(30) Foreign Application Priority Data

May 18, 2011 (EP) .................................... 11166529

(51) Int. Cl.
*H02J 7/00* (2006.01)
*B60L 11/18* (2006.01)
*H02J 5/00* (2006.01)

(52) U.S. Cl.
CPC .............. *B60L 11/182* (2013.01); *H02J 5/005* (2013.01); *B60L 2200/26* (2013.01); *Y02T 10/7005* (2013.01); *Y02T 90/122* (2013.01); *Y02T 90/14* (2013.01)

(58) Field of Classification Search
CPC .................................. H02J 7/025; H02J 5/005
USPC .................................. 320/107–109, 128, 137
See application file for complete search history.

(56) References Cited

U.S. PATENT DOCUMENTS

| 3,914,652 A | 10/1975 | Valkestijn |
| 4,331,225 A | 5/1982 | Bolger |

(Continued)

FOREIGN PATENT DOCUMENTS

| CA | 2687060 A1 | 11/2008 |
| DE | 2916558 A1 | 12/1979 |

(Continued)

OTHER PUBLICATIONS

International Search Report and Written Opinion of the International Searching Authority, dated May 22, 2013, from parent PCT International Application PCT/IB2012/052105: in English.

(Continued)

*Primary Examiner* — Paul Dinh
(74) *Attorney, Agent, or Firm* — George Kapsalas; Patentbuero Paul Rosenich AG

(57) ABSTRACT

The invention relates to systems, devices, and components for inductively charging an electric energy store of an electric vehicle (1) via a charging section (2). The device includes a registration device (20) for localizing the electric vehicle (1) on the charging section (2), an electrical energy source (3) preferably embodied as a high-frequency-energy source, a system of primary conductor loops each with at least one primary winding provided in the charging section (2) for supplying AC current via the electrical energy source (3), a secondary conductor loop arranged on the electric vehicle (1) having at least one secondary winding at least partially permeated by the induction flux, an energy supply line (4), and switching devices (5) for connecting the energy supply line (4) and the system of the primary conductor loops to the electrical energy source (3). All primary conductor loops of the charging section (2), and the secondary conductor loop may be implemented as double dipole loops (6,7,8).

20 Claims, 8 Drawing Sheets

(56) References Cited

U.S. PATENT DOCUMENTS

| | | | |
|---|---|---|---|
| 4,833,337 A | 5/1989 | Kelley et al. | |
| 5,157,319 A | 10/1992 | Klontz et al. | |
| 5,264,776 A | 11/1993 | Hulsey | |
| 5,341,083 A | 8/1994 | Klontz et al. | |
| 5,431,264 A | 7/1995 | Tseng et al. | |
| 5,457,378 A | 10/1995 | Woody | |
| 5,498,848 A | 3/1996 | Wakabayashi et al. | |
| 5,594,315 A | 1/1997 | Ramos et al. | |
| 5,606,237 A | 2/1997 | Biasotti et al. | |
| 5,617,003 A | 4/1997 | Odachi et al. | |
| 5,646,500 A | 7/1997 | Wilson | |
| 5,654,621 A | 8/1997 | Seelig | |
| 5,669,470 A | 9/1997 | Ross | |
| 5,684,380 A | 11/1997 | Woody et al. | |
| 5,703,461 A | 12/1997 | Minoshima et al. | |
| 5,719,483 A | 2/1998 | Abbott et al. | |
| 5,803,215 A | 9/1998 | Henze et al. | |
| 5,821,728 A | 10/1998 | Schwind | |
| 5,903,134 A | 5/1999 | Takeuchi | |
| 5,926,004 A | 7/1999 | Henze | |
| 6,396,241 B1 | 5/2002 | Ramos et al. | |
| 6,421,600 B1 | 7/2002 | Ross | |
| 2005/0178632 A1 | 8/2005 | Ross | |
| 2008/0265684 A1 | 10/2008 | Farkas | |
| 2010/0065352 A1 | 3/2010 | Ichikawa | |
| 2010/0109604 A1 | 5/2010 | Boys et al. | |
| 2010/0181842 A1 | 7/2010 | Suzuki et al. | |
| 2010/0225271 A1 | 9/2010 | Oyobe et al. | |
| 2010/0235006 A1 | 9/2010 | Brown | |
| 2010/0277004 A1 | 11/2010 | Suzuki et al. | |
| 2010/0320843 A1 | 12/2010 | Kitamura et al. | |
| 2011/0109262 A1* | 5/2011 | Iizuka | B60L 11/182 320/108 |
| 2011/0273139 A1 | 11/2011 | Hofheinz | |
| 2011/0285349 A1* | 11/2011 | Widmer | B60L 11/182 320/108 |

FOREIGN PATENT DOCUMENTS

| | | |
|---|---|---|
| DE | 4115568 A1 | 2/1993 |
| DE | 4236286 A1 | 5/1994 |
| DE | 4429656 C1 | 4/1996 |
| DE | 19824290 A1 | 12/1999 |
| DE | 102007026252 A1 | 12/2008 |
| DE | 102008006443 A1 | 7/2009 |
| DE | 202009009689 U1 | 11/2010 |
| DE | 202009009691 U1 | 11/2010 |
| DE | 202009009693 U1 | 11/2010 |
| DE | 102011003543 A1 | 8/2012 |
| EP | 0289868 A2 | 11/1988 |
| EP | 0821371 A2 | 1/1998 |
| EP | 0865050 A2 | 9/1998 |
| EP | 2431214 A1 | 3/2012 |
| FR | 2740921 A1 | 5/1997 |
| GB | 615916 A | 1/1949 |
| JP | 2000-092753 A | 3/2000 |
| JP | 2002-152996 A | 5/2002 |
| JP | 2008-087733 A | 4/2008 |
| JP | 2008-220130 A | 9/2008 |
| JP | 2009-005472 A | 1/2009 |
| JP | 2009-164279 A | 7/2009 |
| JP | 2009-164293 A | 7/2009 |
| JP | 2010-183812 A | 8/2010 |
| WO | 88/02944 A1 | 4/1988 |
| WO | 94/09544 A1 | 4/1994 |
| WO | 95/30556 A2 | 11/1995 |
| WO | 96/32768 A1 | 10/1996 |
| WO | 2010/000494 A1 | 1/2010 |
| WO | 2010/000495 A1 | 1/2010 |
| WO | 2010/031593 A2 | 3/2010 |
| WO | 2010/031595 A2 | 3/2010 |
| WO | 2010/041318 A1 | 4/2010 |

OTHER PUBLICATIONS

Sato, F. et al., "Contactless Energy Transmission to Mobile Loads by CLPS—Test Driving of an EV with Starter Batteries," in IEEE Transactions on Magnetics, Sep. 1, 1997, Bd.33,No. 5, pp. 4203-4205.

European Search Report and EPO preliminary report on patentability mailed Oct. 2011 from priority EPO application No. EP11166529.

* cited by examiner

DEVICE FOR INDUCTIVELY CHARGING AT LEAST ONE ELECTRIC ENERGY STORE OF AN ELECTRIC VEHICLE

CROSS-REFERENCE TO RELATED APPLICATIONS

This application is a 35 U.S.C. 371 national-phase entry of PCT International application no. PCT/IB2012/052105 filed on Apr. 27, 2012 and also claims benefit of priority to prior European application no. EP11166529 filed on May 18, 2011, and also claims priority as a non-provisional of U.S. provisional application Ser. No. 61/487,567 filed on May 18, 2011, and both European application no. EP11166529 and U.S. provisional application Ser. No. 61/487,567, as well as parent PCT International application no. PCT/IB2012/052105, are all incorporated herein by reference in their entireties for all intents and purposes, as if identically set forth in full herein.

TECHNICAL FIELD

The invention relates to a device for inductively charging at least one electric energy store of an electric vehicle on a charging section of road.

BACKGROUND

The farther the development of cars moves towards an electrification of motor vehicles—be it at present by the development of hybrid vehicles, of electric vehicles with an additional combustion engine known as a range extender that is not connected to the transmission but only charges up the drive battery, or of electric vehicles without combustion engines (ZEV's, or Zero Emission Vehicles)—the more common it is to find in vehicle manufacturers' specifications, in particular under conditions of time pressure and personal safety, a practicable way in which to re-supply a vehicle of one of the above named types with battery power from a vehicle-external electrical energy source. These vehicle types mentioned are grouped together below under the collective term "electric vehicles".

At present, to charge the battery of an electric vehicle the following options exist.

In the near future, electric vehicles will be supplied with a precisely specified charging cable for charging their battery at a standardised charging station or at any desired electrical socket for single-phase AC current or for a three-phase supply. Charging at a household socket currently takes approximately 5 to 8 hours, while when charging with three-phase power at a fast charging station, the time taken to charge up a drive battery back to around 80% of its capacity is approximately half an hour. Connection to a socket may conceived of as taking place, for example, while the vehicle is parked at home or near to the workplace or in public car parks.

A considerably faster alternative means of externally recharging an electric vehicle with electrical power, already known to the public, involves changing the entire drive battery. It is planned that, after providing the necessary infrastructure, electric vehicles will drive onto a charging platform at a charging station, a charging shaft will then open underneath the electric vehicle, the drive battery of the electric vehicle will then be fully automatically removed by a robot, placed into a system of underground charging points, charged and then replaced by a drive battery which has been freshly charged there. The entire process of the battery change will not take more than a few minutes.

In particular, if there is no need to even stop to charge the drive battery, contact-free charging methods will become inevitable. A method under discussion is that of inductive charging, because this charging variant represents an application of the law of induction from electrical engineering. This already known charging variant has—of course, again only after creation of the necessary infrastructure—the additional distinct advantage that electric vehicles without a combustion engine can manage with a lighter vehicle battery of lower capacity, if this battery is recharged in a timely fashion while driving along the road, using specially prepared charging sections. In addition, the entire charging process from the registration of the vehicle up to the financial settlement can take place fully electronically. A charging process of this kind is also much more convenient for the customer. However, it is also associated with the occurrence of high-frequency alternating electromagnetic fields in the immediate environment of the electric vehicle. Therefore, it must be ensured that the safety that is obtained by galvanic isolation from the vehicle-external energy source and drive battery in the form of a vehicle-internal energy sink is not negated again, or even merely undermined, by risks to health from high-frequency electromagnetic interference fields. In order to eliminate adverse effects of this type, maximally permissible limits for biological loading by high-frequency alternating electromagnetic fields have been set. These must be strictly observed in order to guarantee the environmental electromagnetic field compatibility (EMF) of devices for transmitting electrical energy to electric vehicles. For example, the effective value of alternating magnetic fields at 150 kHz may not exceed 6.25 µT.

Extensive prior art can be found on the inductive charging of electric vehicles. For conciseness, the devices and methods for inductive charging while travelling are discussed, and those relating to inductive charging while a vehicle is at rest are merely cited.

US2008/0265684A1 discloses a high power wireless resonant energy transfer system for electric vehicles. The energy transmission is disposed on a roadway surface and the energy reception system is disposed on the undercarriage of a vehicle. In an embodiment the energy transfer system comprises a double dual coil configuration shown, for example, in FIGS. 2 and 9 of US2008/0265684A1. In the center of the roadway the currents applied to the dual coil configuration flow in the same direction thereby causing the electromagnetic flux density to concentrate along the center axis of the roadside. This is achieved by clockwise application of current in the first coil and a counter-clockwise application of current in the second coil. However, US2008/0265684A1 does not disclose a registration device for registering or localising electric vehicles.

EP0289868A2 discloses an electrical modular roadway system adapted for transmitting power to and controlling inductively coupled vehicles traveling thereon. The system comprises a plurality of elongated electrically connected inductor modules arranged in an aligned end to end spaced apart in order to form a continuous vehicle path. However, in contrast to US2008/0265684A1 the EP0289868A2 does not disclose a dual coil configuration with a clockwise and counter-clockwise current application.

The article of Sato et al. "Contactless Energy Transmission to mobile loads by CLPS-Test Driving of an EV with starter batteries", IEEE Transactions on Magnetics, Vol. 33, No. 5, September 1997, discloses methods of starting and driving methods of contactless power transmission to electric vehicles. As in EP0289868A2, this article does not disclose a dual coil configuration with a clockwise and counter-clockwise current application.

In DE4429656C1 a device is disclosed for the contactless transmission of electrical energy to an object, which can be applied for example in wheelchairs, cranes, and traffic systems. The resonant series oscillator circuit there disclosed essentially comprises a static subcircuit consisting of an AC voltage source and a plurality of primary conductor loop arrangements in a daisy-chain connection which can be alternately connected in two ways, and a mobile subcircuit consisting of a loaded secondary conductor loop. The mobile subcircuit moves past the daisy chain circuit of primary conductor loop arrangements. The primary conductor loop arrangements are wired via local switches to the feed and return lines of the static subcircuit such that the following two primary circuit variants are produced:

If the mobile subcircuit is positioned above a primary loop arrangement, then the local switches realise a simple primary conductor loop between the feed and return lines, wherein the physically appropriately chosen direction arrows of the current flow through both halves of the loop are oriented according to the disclosure in the same sense as those of the current flow through the respective adjacent feed or return line. If the mobile subcircuit exits the region of inductive coupling to the primary loop arrangement under consideration, then the local connection of this loop arrangement between the feed or return line respectively is changed in such a manner that one primary loop half is connected in parallel in an isolated manner to each of the feed or return lines and the physically appropriately chosen direction arrows of the current flowing through each of the two halves of the loop are oriented according to the disclosure in the opposite sense to those of the current flow through the respectively adjacent feed or return lines.

In terms of circuitry, the primary part of the series resonance circuit may be regarded as a concatenation of primary four-poles, wherein each four-pole essentially includes a section of the feed line, one of the primary loop arrangements, a section of the return line, and the local switches.

All primary four-poles of the daisy chain circuit described from the AC voltage source up to and excluding the four-pole currently inductively transmitting energy to the secondary circuit, for example the active primary four-pole, are certainly fed by the AC voltage source, but due to its described structure the magnetic field of each of these primary four-poles is approximately cancelled out after switching over to the passive operating state. In order to reduce the adverse effect of the local energy transmission by the active four-pole as a result of these passively connected primary four-poles, by means of a locally serial capacitor and a parallel capacitor connected upstream of the whole four-pole chain, a reactance compensation is carried out. All other primary four-poles up to the end of the feed and return line are, according to the disclosure, powered off.

This device is suitable for charging the batteries of electric vehicles when the vehicle is in motion and at rest, and effects a good magnetic coupling between the primary and secondary circuits. It achieves the high efficiency associated therewith, however, only by arrangement of the energy supply lines at both outer longitudinal sides of the four-pole chain. Since these energy supply lines also contribute in a negligible manner to the stray inductance of the active primary conductor loop, the effective stray reactances of the overall system are different depending on which primary loop arrangement may be active: the further away the active primary conductor loop is from the energy source, the greater is the resulting stray reactance of the overall system. Therefore, the compensation for each actively connected conductor loop must be individually matched in an extremely expensive manner.

Since the active conductor loop generates a dipole field with correspondingly long range, the prerequisites are created which, when using such a device for inductively charging the batteries of an electric vehicle, produce electromagnetic interference fields on both sides of the vehicle which detract from its use for energy transmission and which may jeopardise human and animal health. In order to be able to comply with the above described EMF limits, the field strength must be kept small even in the spatial region provided for the energy transmission underneath the electric vehicle, and therefore in order to transmit a predefined amount of electrical energy to the electric vehicle, the overall length of the required charging section—which may be implemented either contiguously or divided into individual sections—must be chosen to be sufficiently large. The resulting cost aspect indicates that the device for energy transmission according to DE4429656C1 has scope for improvement.

A further disadvantage of the arrangement is that when the secondary loop is in an overlapping position, a reverse effect of the secondary loop on the two short-circuited primary loop halves, serving to supply energy, occurs both across the active primary loop and across the passive primary conductor loop arrangement which supplies energy. This may lead to a loss of power and considerable interference fields.

In documents US2005/0178632A1, WO95/30556A2, U.S. Pat. No. 6,421,600B1 and US5,669,470A, a ZEV is described, the electrical energy stores of which, in particular electrochemical or electromechanical batteries, (with a rotor rotating on magnetic bearings in a vacuum-tight chamber), are inductively charged on short subsections (1-10%) of a stretch of road. The inductive charging takes place via a system of primary conductor loops laid in the subsections of the road, and a secondary conductor loop on the vehicle. The distance between the primary conductor loops and the secondary conductor loop can be adjusted via the vehicle and with the intention of obtaining the highest possible magnetic coupling may be reduced down to zero, this latter naturally only when at rest. No information can be found however as to its compliance with EMF limits or as to how the costs associated with the construction of the charging section might be reduced.

The disclosed content of US5,821,728A and DE19824290A1, where a system for inductively charging railbound and non-railbound pure electric vehicles while travelling and at rest is presented, is kept within a similarly narrow range with regard to economic optimisation and observance of prescribed EMF limits. The same applies to DE4115568A1, where it is alternatively proposed to arrange the primary conductor loops on the edge of the road surface and to mount the secondary conductor loops in the wheels or in the tire carcasses, and also to DE2916558A1, US3,914, 652A and GB615916A.

Documents WO2010/031595A2, WO2010/000495A1, WO2010/000494A1 and WO2010/031593A2 describe systems for inductively transmitting electrical energy to electric vehicles, which employ connecting wires continuously along each route to be travelled and are therefore railbound. An arrangement of primary windings or coils is laid in the road surface. In contrast to the other documents relating to the prior art however, the arrangement of secondary conductor loops includes a system of multiple conductors which pass alternating currents of different phase and are laid on the railbound electric vehicle extending along its direction of travel. This is intended to allow fluctuations of the power flow to be largely compensated for. In addition, by this means the transmissible electrical power density should be improved so as to observe the permissible EMF limits.

A disadvantage is that this method for transmitting electrical energy is only applicable to wired, and therefore rail-bound, electric vehicles with a certain minimum length (train sets or at least long trolleybus coach sets,) and is therefore inapplicable to non-railbound electric vehicles, the majority of which are below five meters in length.

Devices for inductively charging the batteries of electric vehicles at rest are disclosed in the following publications: JP2010-183812A, WO2010/041318A1, DE4236286A1, WO96/32768A1, EP0865050A2, WO94/09544A1, EP0821371A2, DE202009009693U1, DE202009009691U1, DE202009009689U1, US5,157,319A, US5,341,083A, U.S. Pat. No. 5,703,461 A, US5,617,003A, US5,264,776A, US5,498,848A, US5,646,500A, US5,719,483A, US5,606,237A, US5,594,315A, US5,684,380A, U.S. Pat. No. 6,396,241B1, US5,903,134A and US5,457,378A.

An object of the present invention is to create a device for effectively inductively charging the batteries of electric vehicles during travelling, which for a specified amount of electrical energy to be transmitted to the electric vehicle and also observing the maximum permissible EMF limits, effects a shortening of the charging section, and therefore also of the charging time, as well as reduction in the charging section costs compared to the prior art.

This object is achieved by a device for inductively charging an electric vehicle, characterized in that the primary conductor loop unit(s) each comprise at least two loop halves, arranged side by side forming a double dipole loop, which can have current applied to them in opposite senses, and wherein the registration device is preferably implemented as a high-frequency transmission system, and wherein the device comprises switching devices for connecting the energy supply line with the system of the at least one primary conductor loop unit, wherein at least one switching device is assigned to each primary conductor loop unit, and wherein the feed line of the energy supply line for switching on all primary double dipole loops is implemented in a branched manner, the return line however is implemented in a non-branched manner and the conductor end of the return line is short-circuited to a terminal of a last switching device.

In a preferred version the implementation of the feed line in a branched manner means that the feed line includes feed line portions that are connectable with each other and that may be branched off towards a respective primary double dipole loop by means of the switching devices.

The return line is implemented in a non-branched manner. In order to activate a double dipole loop, both loop halves forming the double dipole loop must be connectable to the feed line. This is preferably achieved by two subsequent switching devices in the feed line.

An important advantage of this solution lies in the fact that the effective length of the supply line (comprising the feed line and the return line) stays the same, independent of which loop unit is switched to the supply line at a particular moment. The effective length is the length of the supply line which carries current. For this reason also, the effective inductivity of the supply circuit does not change when in a subsequent manner the individual loop units are connected to the supply line by means of the switching devices. The constant inductivity has an advantageous influence on the energy supply as well as on the switching processes as such, since the whole charging device and its electrical components may be optimized and dimensioned for the one constant effective inductivity of the supply line.

Due to the fact that AC current is applied to the supply line, the naming of "feed line" and "return line" is arbitrary. The last switching device is the switching device at the end of the charging device or the charging section, respectively, which end is opposite to the connection end for connecting to an electrical energy source (as may be seen from FIG. 4).

The switching devices are provided for connecting the feed line with one or a certain number of loop unit(s) (branching off). Concurrently, other loop units are not connected to the feed line. In this preferred version, respective feed line portions are connected by means of the remaining switching devices (i.e., those switching devices which do not branch off the feed line towards a loop unit; as may be easily seen from FIG. 4). At least one switching device is assigned to each primary conductor loop unit.

The invention also comprises an electric vehicle having an energy store. Such an electric vehicle according to the invention is designed to be used in connection with charging with the inductive charging device according to the invention.

A part of the solution is the construction of a primary and secondary conductor loop unit as a double dipole loop.

Due to the compensation of the far-reaching alternating electromagnetic interference fields in favor of the desired electromagnetic alternating near field, the mean diameter of the conductor loops forming part of the conductor loop arrangement according to the invention, namely of the two halves of the double dipole loop, can thereby be significantly reduced. This measure for compensating alternating magnetic interference fields may be further improved by a known method by reducing the distance between the conductors laid in the road surface, i.e. in the extreme case by supplying the electrical energy via a pair of closely adjacent conductors (feed and return line). The two halves of the double dipole loop are therefore arranged according to the invention on both sides of this energy supply line.

If according to the invention all the primary conductor loops of the charging section and the mobile conductor loop forming the secondary circuit are both implemented in this manner as double dipole loops with horizontally adjacent double dipole loop-halves, then the current flow takes place in two active associated halves circulating in an opposite direction in each case. The magnetic field lines therefore pass through the horizontally adjacent double dipole loop-halves with different orientations, and can penetrate a secondary double dipole loop located above them in the same manner. This facilitates a good magnetic coupling, and thus a high transmission power. However, the differing orientation leads to an almost complete compensation of the fields outside the conductor loops.

By this arrangement, when using double dipole loops a larger part of the alternating magnetic field is kept within the nearer environment of the mutually inductively coupled loops than is the case for a pair of simple loops inductively coupled together. In other words, the long-range effect of the alternating magnetic field associated with the inductive energy transfer in the variant according to the invention is lower, or the magnetic coupling is tighter.

The invention may be embodied both as a charging section with a plurality of loop units arranged sequentially in the direction of conductor, and as a charging parking space with a conductor loop unit. In the latter case the vehicle is at rest.

A conductor loop unit is formed from two loop halves of a double dipole loop. The loop halves are arranged next to each other side by side. In the case of a charging section the loop halves belonging to a conductor loop unit are arranged side by side in a transverse direction, preferably perpendicular to, the direction of travel or the longitudinal direction of the charging section. The secondary conductor loop unit on the electric vehicle is designed to correspond, i.e. the halves of the loop are also arranged side by side and in a direction transverse to the direction of travel.

The loop halves of a double dipole loop may have current applied to them in opposite senses.

When travelling over the charging section, each of the halves of the loop of the electric vehicle move over the loop halves of the charging section in sequence, wherein each loop half of the electric vehicle travels over those loop halves of the charging section which are energised with current in the same sense.

The areas which are bounded by the two loop halves of a conductor loop unit do not overlap one another, or at least not substantially. Preferably, the loop halves lie at least essentially in the same plane. In the charging section the loop areas lie essentially parallel to the road surface, in a corresponding electric vehicle they are parallel to its underside.

The individual conductor loop units may then be connected individually, or independently of one another, to the energy supply device. This is effected by means of switching devices. In a charging section with a plurality of conductor loop units each conductor loop unit has at least one switching device assigned to it. A switching device connects according to the position of an electric vehicle on the charging section the respective conductor loop unit located underneath the electric vehicle to the energy supply line, so that while the car is driving over it, this conductor loop unit is energised with current. The registration device for locating the electric vehicle communicates with the switching devices in such a manner that only that (those) conductor loop-unit(s) is (are) activated that is(are) currently located underneath the electric vehicle as it drives over them.

In the case of a charging parking space, that charges the vehicle when at rest, a switching device is not absolutely necessary.

The two energised loop halves of a double dipole loop may form a "figure of eight", an 8, or have the form of an "S," or a snake-like shape. The loop halves may also be composed of multiple windings.

The invention may also be manifested in a method for charging an electric vehicle.

Preferably, the generator frequency of the primary circuit is adjustable such that the phase shift of the AC current through the secondary conductor loop unit is preferably approximately +90 degrees relative to the AC current through the active primary double dipole loop. In such a manner, the operating point of the resonance circuit may be optimized.

The previously mentioned guiding of the feed and return lines of the energy supply line in an immediately adjacent arrangement is readily compatible with the arrangement of both halves of a primary double dipole loop on both sides of the energy supply lines. Such an arrangement guarantees the concatenation described above with the preferably similarly shaped, secondary double dipole loop which is moved over it.

The increased efficiency of the energy transmission achieved by the use of double dipole loops may be increased still further according to the invention. Namely, if the control system of the power units of the switching devices and the interconnection of the energy supply line are implemented in the known manner with the system of primary double dipole loops and with the electrical energy source for supplying in each case that active primary double dipole loop in which the electric vehicle is localised by a registration device, and if preferably all other primary double dipole loops are each powered off according to the invention, then, as previously mentioned above, in contrast to DE 44 29 656 C1, with the unavoidable spatial overlapping of the secondary conductor loop moving in the direction of travel with two primary conductor loops in the course of the forward motion of the electric vehicle, then voltages are prevented from being inductively back-coupled into the primary conductor loop which is just being passed. This prevents the efficiency of the electrical energy transmission from being reduced.

The above mentioned registration device may be implemented as a high-frequency transmission system that facilitates a data transfer in both directions: from the vehicle to the loop, and oppositely from the loop or transmission station to the vehicle. Devices which may be advantageously combined with the contactless energy transmission for charging the vehicle batteries are, for example, the known Radio Frequency Identification (RFID) systems.

According to the above described improvement, by compensation of unwanted alternating magnetic interference fields in the magnetic coupling, the transmission power in a section of road may be increased to such an extent that it is as large as or even greater than the power that the electric vehicle draws from the drive battery to overcome the instantaneous drive resistances. Thus, even at high speed (e.g., on motorways) electric vehicles may recharge the battery, so that given appropriate development of the charging sections, almost any arbitrary ranges may be achieved. This would make the "Achilles heel" of the pure electric vehicle (ZEV)—its short range combined with a long charging time—finally become a thing of the past.

The switchover from one primary double dipole loop to the next is preferably recommended to take place in the zero crossing of the alternating current in the series resonant circuit. For at this point in time, the capacitor has the energy content corresponding to the latest steady state of the series resonant circuit. With this choice of switching time the current amplitude does not need first to settle into a new steady state, and after the switching process it is available almost unchanged for further energy transmission. Further advantages of this choice of the switchover time include low switching losses and the prevention of switching voltage spikes which could be dangerous for the power switches.

In this context, a further considerable cost benefit from the use of double dipole loops for the inductive charging becomes evident. All non-active primary conductor loops according to the invention are indeed switched off, i.e. a reverse voltage is applied to each of the power switches, which are provided between the AC voltage source and the active primary conductor loop for switching the primary conductor loops on and off, and which—due to the switching off of these conductor loops according to the invention—are in the blocking state. On switching to the active primary conductor loop at the current zero crossing, this assumes its maximum value. However, because each of these switches according to the invention only has to attain the voltage of a double dipole loop half as a reverse voltage, all of the power switches may be dimensioned to lower values with respect to their breakdown voltage. This saves considerable costs in terms of active components.

Not only component costs, but also conductor costs are saved by the construction of the electrical parts of the charging section according to the invention. This is due to the fact that the energy supply line contributes to the inductance of the active conductor loop arrangement.

Additionally, extensive simulations have shown that the efficiency of the electrical energy transmission also—to the extent that this is possible by matching to the secondary load—may be further optimised by tuning the reactances in the primary circuit equipped with double dipole loops and the reactances in the similarly implemented secondary circuit. A phase shift of +90° of the secondary current with respect to the primary current has proved particularly advantageous here in the case of the resonance of the primary series resonant circuit.

In special interconnection variants, the cost outlay on passive components of the series resonant circuit may be reduced even further compared to the prior art. This series resonant circuit may therefore also be dimensioned more easily. If, for example, the return line is non-branching and the energy supply line is terminated with a short-circuit (via a terminating jumper), then the total inductance appearing at the generator is independent of which primary double dipole loop is currently active. In matching to the primary total inductance, and regardless of which primary double dipole loop is currently active, only a single capacitor with a constant capacitance is then necessary in order to bring about the desired steady state of the resonant circuit during the overall charging process.

To produce the structure according to the invention of double dipole loops to be coupled to both sides of the energy supply line, fast power switches prove advantageous. They perform the switching of the two double dipole loops to the energy supply line, or switch them off, in connection with establishing a transfer of the energy feed to the next pair of double dipole loops in the direction of travel that are to be switched on.

Since the magnetic fields occurring for inductively charging the batteries of an electric vehicle must be shielded from the vehicle passenger compartment, for example by a ferrite screen, an arrangement of the secondary double dipole loop underneath or in the vehicle floor is advantageous.

Apart from this, the device according to the invention is also suitable for inductively charging the batteries of electric vehicles at rest. Exactly the same advantages as those already mentioned are produced as with a charging process while the vehicle is travelling, in particular the reduction of the alternating magnetic field strength with regard to persons spending time within the accessible area next to the electric vehicle.

BRIEF DESCRIPTION OF THE DRAWINGS

In following, the invention will now be explained using examples from a number of figures. These show.

DETAILED DESCRIPTION

Figure 1:
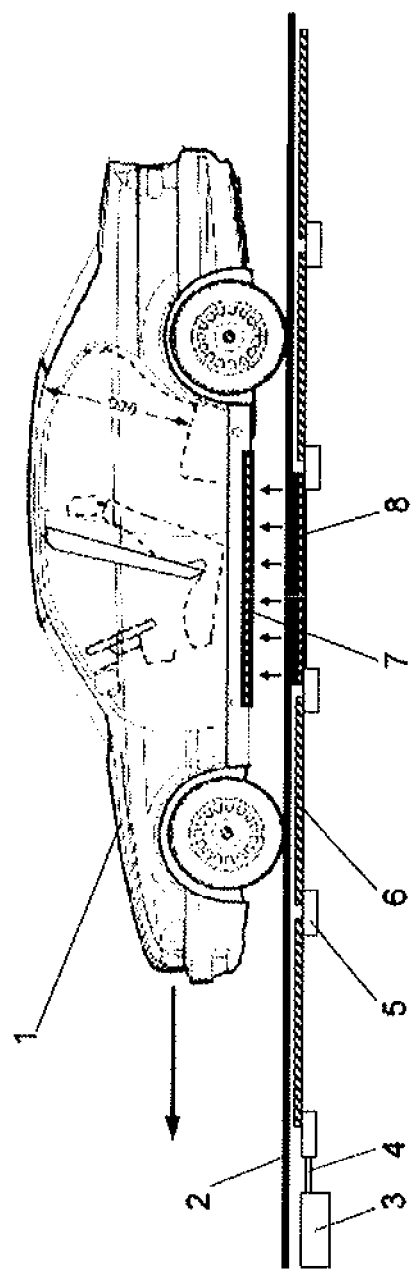
FIG. 1 depicts an electric vehicle on a schematically illustrated charging section according to the invention in a side view.

The electric vehicle 1 in FIG. 1 is equipped with a double dipole loop 7 according to the invention mounted on the underside thereof, and interacts with a charging section 2 according to the invention, shown schematically, being travelled over in the direction of travel indicated by the arrow. Laid within the charging section 2 are primary double dipole loops 6, that are connected to an energy supply line 4 via switching devices 5. The energy supply line 4 is supplied with AC current by an electrical energy source 3 in the high-frequency range, preferably in the 25-150 kHz range. The primary double dipole loop 8 located under the electric vehicle 1 is actively connected and magnetically coupled to the secondary double dipole loop 7. A primary double dipole loop 8 here forms a conductor loop unit. Along a charging section 2, a plurality of conductor loops units are lined up one behind another. The secondary double dipole loop 7 on the electric vehicle 1 forms the secondary conductor loop unit.

Figure 2A:
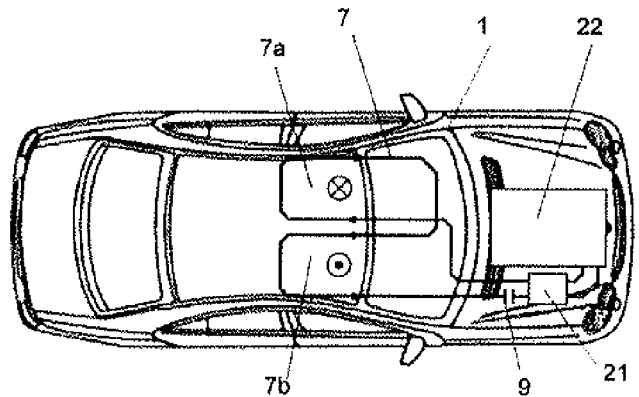
FIG. 2a depicts a top view of the electric vehicle according to FIG. 1 in an outline sketch.
Figure 2C:
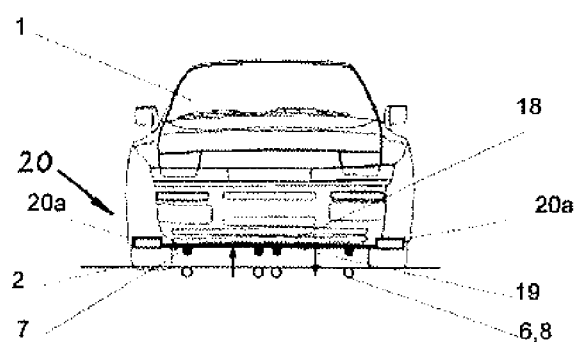
FIG. 2c depicts the electric vehicle according to FIG. 1 in a frontal view.

An exemplary version of the secondary double dipole loop 7 is illustrated in FIGS. 2a and 2c. If two spatial areas each bounded by a loop half 7a, 7b are formed with uniformly oriented areal elements, then the field lines of the alternating magnetic field (shown by arrows) pass through these spatial areas with an orientation corresponding to their right-handed assignment to the respective circulation direction, defined by the current direction arrows. The magnetic field lines penetrating the double dipole loop half 7a therefore pass into the plane of the drawing, those magnetic field lines which penetrate the double dipole loop half 7b pass out of the plane of the drawing. The double dipole loop is connected via a secondary resonance capacitor 9 to a rectifier 21, the output of which is in turn connected to the drive battery 22.

Figure 2B:
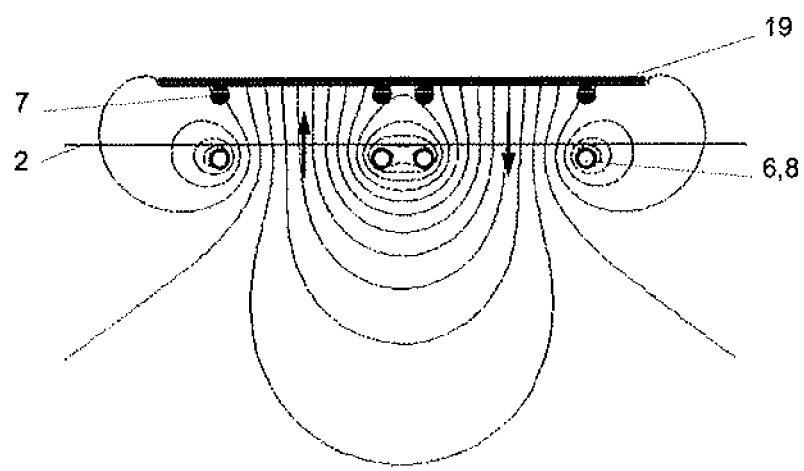
FIG. 2b a simulated field plot.

FIG. 2b illustrates a simulated plot of the field lines. Those field lines which, after passing through the primary and secondary double dipole loop halves placed above one another, form a complete circuit via the other respective pair of double dipole loop-halves, form the basis of the increase in magnetic coupling according to the invention, which leads to a reduced long-range effect of the alternating electromagnetic field and to a weakening of unusable magnetic interference flux in favour of the useful magnetic flux.

In the vehicle floor 18 above the secondary double dipole loop 7 a ferrite screen 19, preferably with a thickness of a no more than a few millimeters, is installed. With its ferromagnetic properties it is provided for screening the vehicle passenger compartment against the alternating electromagnetic field associated with the energy transmission. All incoming magnetic field lines are interrupted at the ferrite screen 19 in a tangential direction, so that the principal component of the magnetic field does not penetrate as far as the vehicle floor 18. In addition, due to this ferrite screen, any significant heating of the car body by eddy currents, and the losses in the efficiency of the energy transmission resulting therefrom, are prevented.

In FIG. 2a or 2c, transponders 20a are additionally shown, also schematically, as exemplary version of components of the registration devices 20 on both longitudinal sides of the vehicle floor 18. The arrangement on only one of the two longitudinal sides of the vehicle floor 18 or at other places inside the vehicle floor 18 is also possible. The read devices 20b with transmitter and receiver may be seen in FIG. 3, also depicted schematically and in exemplary form. While the transponders 20a behave passively outside the response region of the read devices 20b, inside the response region of the read devices 20b they are activated, localise the electric vehicle 1 on the charging section 2 and cause a control device of the charging section 2 to initiate the switchover to the relevant following active primary double dipole loop 8.

Figure 3:
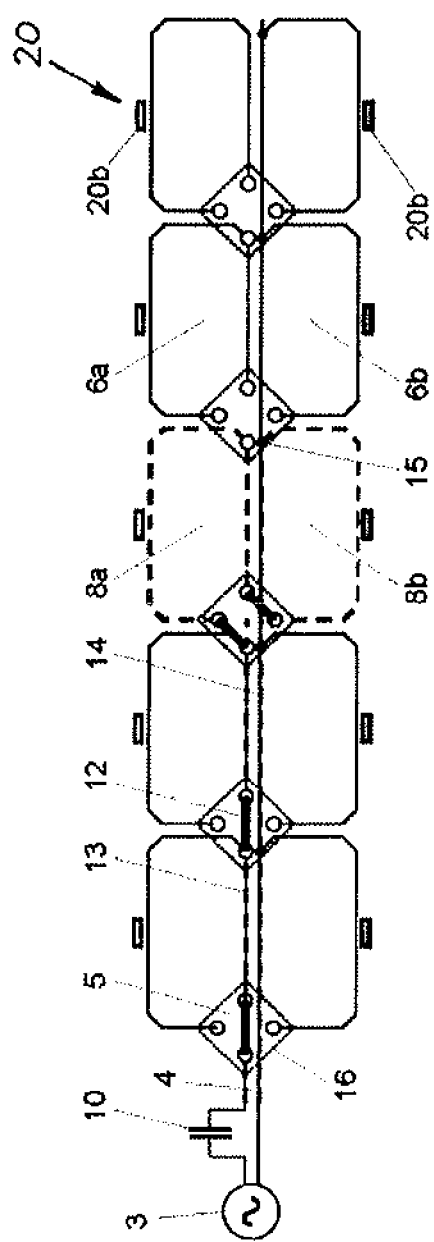
FIGS. 3-4 are schematic diagrams of a charging section of road laid with simple double dipole loops and a branching or non-branching return line.

FIG. 3 schematically illustrates the electrical parts of a charging section 2 in an outline sketch. The electrical energy source 3 supplies the active double dipole loop 8 via the energy supply line 4 and the capacitor 10. To activate the double dipole loop 8 the associated switching device 5 switches the "upper" (shown at the top of the drawing) double dipole loop-half 8a to the feed line 13 and connects the double dipole loop-half 8a to the "lower" double dipole loop-half 8b. The latter, due to its branching connection to the return line 14, is permanently electrically connected to all "lower" double dipole loop-halves which are arranged on one of the two sides of the energy supply line 4.

The double dipole loops 6 between the electrical energy source 3 and the active double dipole loop 8 with their halves 6a and 6b, just like those of the active double dipole loop 8, are, according to the invention, connected to double dipole loops 6, spatially arranged downstream in the direction of travel, in a powered-off state.

Figure 4:
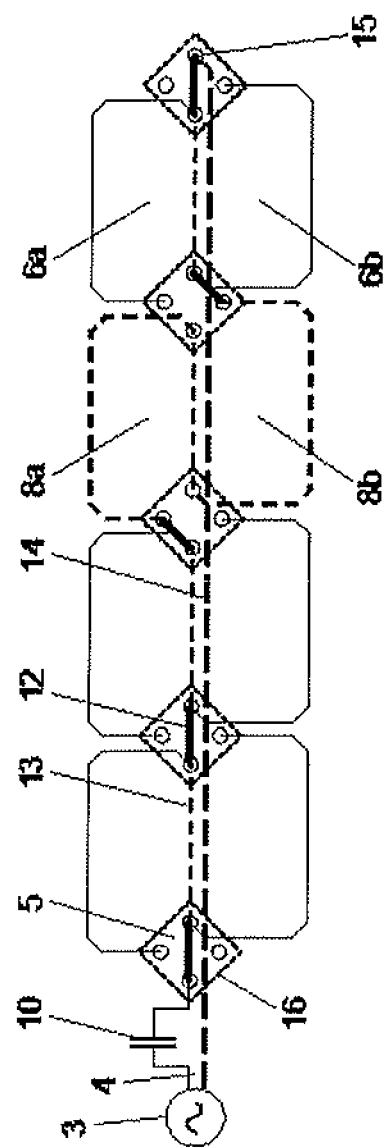

FIG. 4 depicts a further exemplary version of the charging section 2 according to the invention. However, the return line 14 here, in contrast to the version according to FIG. 3, is non-branching. The effect of this is that in order to activate the double dipole loop 8, both its "upper" loop half 8a and also its "lower" loop half 8b must be connected to the feed line 13. In producing these two conducting connections, in contrast to the version according to FIG. 3, both the switching device 5 belonging to the double dipole loop 8 and also that—viewed in the direction of travel—belonging to the spatially following double dipole loop are involved, with the result that a corresponding matching of the control of these two power switches is necessary. In the preferred version, as may be readily seen from FIG. 4, the implementation of the feed line 13 in a branched manner is done in that the feed line 13 includes feed line portions which are connectable with each other and may be branched off towards a respective double dipole loop 8 by means of switching devices 5. In addition, in contrast to the embodiment according to FIG. 3, in the case of the double dipole loop furthest away from the electrical energy source 3, the end 15 of the energy supply line 4 is short-circuited by a terminating jumper. The advantages of this circuit variant have already been explained above.

Figure 5:
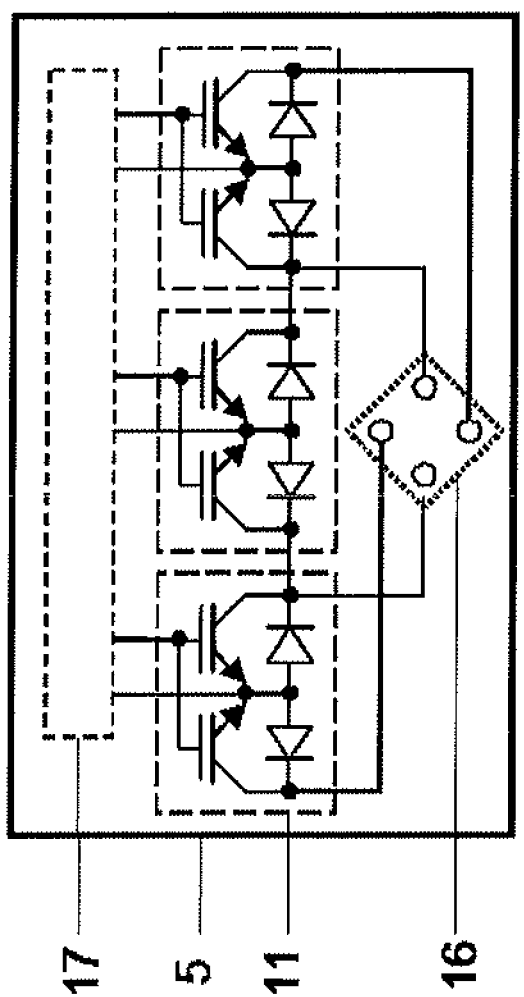
FIGS. 5 and 7 depict exemplary versions of power switches.

In FIG. 5, an exemplary version of the layout of a switching device 5 is shown. According to its function, in one version of the charging section 2 according to FIG. 3 or FIG. 4 to operate three switching paths 12 in each case, the switching device 5 includes three power modules 11 and the contact region 16 required to operate the three switching paths 12, and a gate driver 17. The power modules 11 in this exemplary embodiment are implemented as anti-serially connected pairs of IGBT's, wherein both the gates as well as the emitters of both components are jointly driven via the gate driver. Naturally, the obligatory anti-parallel freewheeling diodes are also integrated into the circuit. The four switching contacts are wired to the contact region 16 such that each of the three power modules 11 may operate, i.e. open or close, exactly one of the three switching paths 12 required according to FIGS. 3 to 4.

Figure 6:
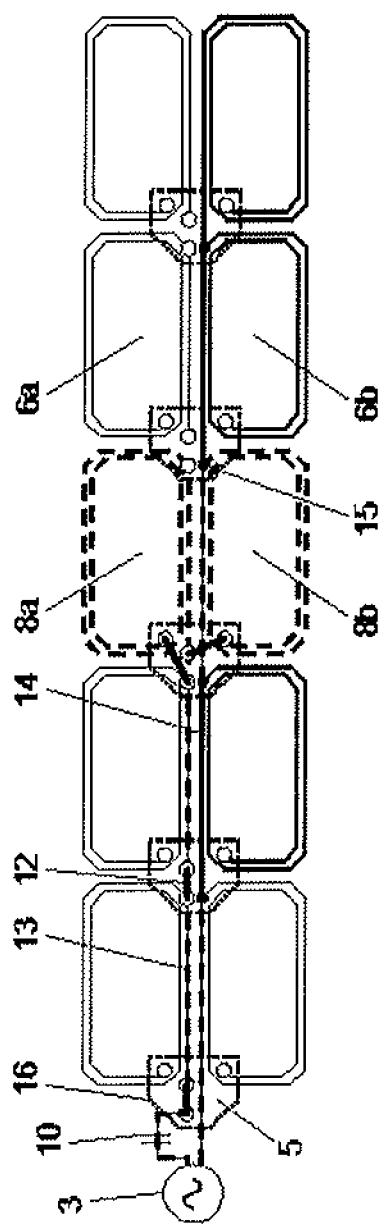
FIG. 6 is a schematic diagram of a charging section laid with double dipole loops with two windings per loop half and branching return line.

Finally, FIG. 6 illustrates an exemplary version of the charging section 2, in which the double dipole loops 6,8 are equipped with more than one winding per double dipole loop-half. In the exemplary version as illustrated, there are two windings per double dipole loop-half. The number of windings per double dipole loop-half may either be held constant over the entire charging section 2, or also varied by switching individual coils in or out, preferably while maintaining the same number of windings for both halves of a double dipole loop 6,8. This may fully or semi-automatically carry out the process of transmitting electrical energy to the electric vehicle 1 while the vehicle is driving on the charging section 2, for example, by speeding up the charging process, or by optimizing this process according to various optimization criteria. Also visible in this figure is the single capacitor 10 of the series resonant circuit, which may be dimensioned to suit the resonance case.

Figure 7:
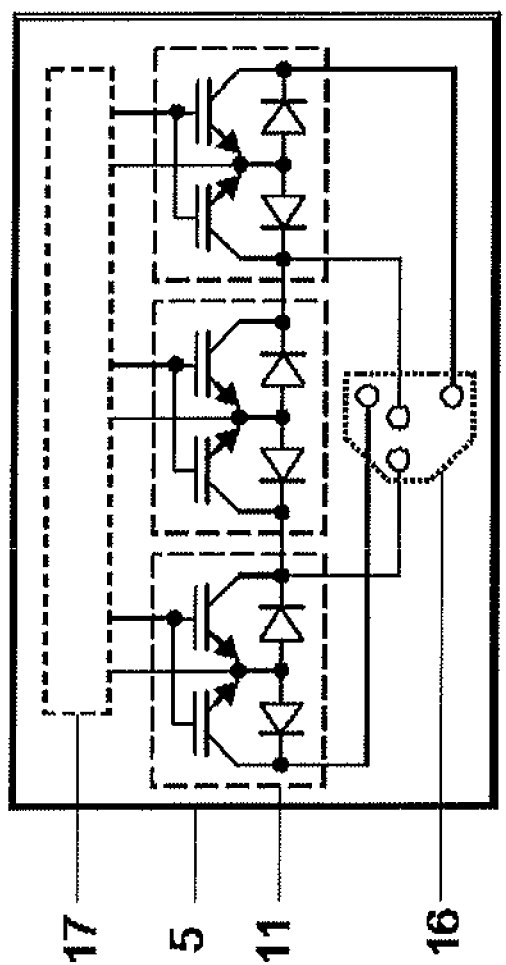

FIG. 7, like FIG. 5, depicts an exemplary version of the layout of a switching device 5, wherein the contact region 16 has been modified to match the representation in FIG. 6.

It still remains to add that different mean diameters and different geometries are expressly permitted for the double dipole loops according to the invention. This also applies particularly to the relative positioning of primary and secondary double dipole loops. The efficiency level of the transmission of electrical energy from the primary to the secondary side depends primarily on how the double dipole loops involved in the energy transmission are magnetically concatenated together.

LIST OF REFERENCE LABELS 1 electric vehicle
2 charging section
3 electrical energy source
4 energy supply line
5 switching device
6 primary double dipole loop
7 secondary double dipole loop
8 active primary double dipole loop
9 secondary capacitor
10 primary capacitor
11 power module
12 switching path
13 feed line
14 return line
15 effective conductor end of return line 14
16 contact region of the switching device
17 gate driver
18 vehicle floor
19 ferrite screen
20 registration device
20a vehicle-side part of the registration device (transponder)
20b stationary part of the registration device (read device)
21 rectifier
22 drive battery

What is claimed is:
1. A system for charging electric vehicles comprising:
an electric vehicle;
a charger;
a charger-side registration device configured to register presence of said electric vehicle;
an electrical energy source configured to supply AC current;
a charger energy supply line connected to said energy source;
at least one primary-conductor loop unit in said charger;
a first loop half in said at least one primary-conductor loop unit;
a second loop half in said at least one primary-conductor loop unit, said second loop half and said first loop half being arranged side-by-side to pass current in mutually opposite sense and to form a double dipole loop;
at least one switching unit configured to controllably connect said energy supply line to said at least one primary-conductor loop unit, said at least one switching unit being assigned to said at least one primary-conductor loop unit;

said charger energy supply line extending in a branched feed line;

an unbranched return conductor line, said return conductor line having a return conductor end;

an ending switching unit, said return conductor end being short-circuited to a terminal of said ending switching unit; and, a secondary conductor loop unit configured for magnetic coupling to said primary conductor loop unit, said secondary conductor loop unit being arranged on said electric vehicle.

2. A system for charging electric vehicles as claimed in claim 1, further comprising:

a plurality of primary conductor loop units;

said plurality of primary conductor loop units being laid along a charging section; and, said charger-side registration device locating the presence of said electric vehicle on said charging section.

3. A system for charging electric vehicles as claimed in claim 2, further comprising:

a plurality of double dipole loops, each of said double dipole pools being respectively situated in a respective one of said plurality of primary conductor loop units;

a plurality of switching units controllably supplying current from said charger energy supply line to power-on as active at least one primary double dipole loop situated in a primary conductor loop unit at which presence of said electric vehicle on said charging section is located, while concurrently powering off double dipole loops situated in primary conductor loop units at which said electric vehicle is not present.

4. A system for charging electric vehicles as claimed in claim 3, further comprising:

a primary capacitor connected to said electrical energy source and said charger energy supply line, in series with said active at least one primary double dipole loop to form a series resonant circuit, said primary capacitor being dimensioned to obtain resonance of said series resonant circuit.

5. The system for charging electric vehicles as claimed in claim 4, wherein:

said series resonant circuit is dimensioned relative to said secondary conductor loop unit so that phase shift of AC current through said secondary conductor loop unit is approximately +90 degrees relative to AC current through said active at least one primary double dipole loop.

6. The system for charging electric vehicles as claimed in claim 4, wherein:

said series resonant circuit has adjustable generator frequency producing phase shift of AC current through said secondary conductor loop unit of approximately +90 degrees relative to AC current through said active at least one primary double dipole loop.

7. The system for charging electric vehicles as claimed in claim 4, wherein:

a zero crossing of current in said series resonant circuit controls said plurality of switching units to switch over to active at least one other primary double dipole loop.

8. A system for charging electric vehicles as claimed in claim 1, further comprising:

said at least one switching unit having a plurality of power modules controllably switching on said first and second loop halves of said double dipole loop.

9. A system for charging electric vehicles as claimed in claim 8, further comprising:

said plurality of power modules are assembled with MOSFETs.

10. A system for charging electric vehicles as claimed in claim 8, further comprising:

said plurality of power modules are assembled with IGBTs.

11. The system for charging electric vehicles as claimed in claim 1, wherein:

said first and second loop halves are of different geometry.

12. A system for charging electric vehicles as claimed in claim 1, further comprising:

a plurality of windings included in said first and second loop halves.

13. The system for charging electric vehicles as claimed in claim 12, wherein:

said windings are switchably controlled.

14. The system for charging electric vehicles as claimed in claim 1, wherein:

said first and second loop halves are arranged on both sides of said charger energy supply line.

15. A system for charging electric vehicles as claimed in claim 1, further comprising:

a vehicle-side registration device configured to cooperate with said charger-side registration device to register presence of said electric vehicle;

a secondary first loop half in said secondary conductor loop unit;

a secondary second loop half in said secondary conductor loop unit, said secondary second loop half and said secondary first loop half being arranged side-by-side to pass current in mutually opposite sense and to form a secondary loop unit double dipole loop, said secondary loop unit double dipole loop being situated with a vehicle floor.

16. A system for charging electric vehicles as claimed in claim 15, further comprising:

a ferrite screen arranged between said secondary loop unit double dipole loop and said vehicle floor.

17. The system for charging electric vehicles as claimed in claim 15, wherein:

said secondary first and secondary second loop halves are of different geometry.

18. A system for charging electric vehicles as claimed in claim 15, further comprising:

a plurality of windings included in said secondary first and secondary second loop halves.

19. A system for charging electric vehicles as claimed in claim 15, further comprising:

an energy store in said electric vehicle, said secondary conductor loop unit being electrically connected to charge said energy store;

a secondary capacitor connected in series with said secondary conductor loop unit to form a vehicle-side series resonant circuit, said secondary capacitor being dimensioned to obtain resonance of said vehicle-side series resonant circuit.

20. A charger comprising:

a charger-side registration device configured to register signalling for charging;

an electrical energy source configured to supply AC current;

a charger energy supply line connected to said energy source;

at least one primary-conductor loop unit in said charger;

a first loop half in said at least one primary-conductor loop unit;
a second loop half in said at least one primary-conductor loop unit, said second loop half and said first loop half being arranged side-by-side to pass current in mutually opposite sense and to form a double dipole loop;
at least one switching unit configured to controllably connect said energy supply line to said at least one primary-conductor loop unit, said at least one switching unit being assigned to said at least one primary-conductor loop unit;
said charger energy supply line extending in a branched feed line;
an unbranched return conductor line, said return conductor line having a return conductor end;
an ending switching unit, said return conductor end being short-circuited to a terminal of said ending switching unit.

\* \* \* \* \*